United States Patent
Marlett et al.

(10) Patent No.: US 7,991,527 B2
(45) Date of Patent: Aug. 2, 2011

(54) MULTIPLE PROTOCOL RECEPTION AND DIFFERENTIATION

(75) Inventors: Brian Marlett, Macomb, MI (US); Patricia Kachouh, Sterling Heights, MI (US); Gerald Ostrander, Davison, MI (US); Tejas B. Desai, Troy, MI (US); Brian Farrell, Troy, MI (US)

(73) Assignee: Continental Automotive Systems US, Inc., Auburn Hills, MI (US)

( * ) Notice: Subject to any disclaimer, the term of this patent is extended or adjusted under 35 U.S.C. 154(b) by 614 days.

(21) Appl. No.: 12/014,275

(22) Filed: Jan. 15, 2008

(65) Prior Publication Data

US 2008/0177441 A1 Jul. 24, 2008

Related U.S. Application Data

(60) Provisional application No. 60/881,767, filed on Jan. 22, 2007.

(51) Int. Cl.
*G06F 19/00* (2011.01)
*H04J 3/22* (2006.01)
(52) U.S. Cl. .......................... 701/36; 340/825.7; 370/384
(58) Field of Classification Search ............. 340/825.69, 340/825.72; 370/469, 474
See application file for complete search history.

(56) References Cited

U.S. PATENT DOCUMENTS

| 6,448,892 | B1 * | 9/2002 | Delaporte | 340/442 |
|---|---|---|---|---|
| 7,199,613 | B2 * | 4/2007 | Chauhan et al. | 326/81 |
| 7,414,522 | B2 * | 8/2008 | Conner et al. | 340/447 |
| 7,672,271 | B2 * | 3/2010 | Lee | 370/328 |
| 2002/0083189 | A1 * | 6/2002 | Connor | 709/236 |
| 2003/0048178 | A1 * | 3/2003 | Bonardi et al. | 340/442 |
| 2005/0104715 | A1 * | 5/2005 | Farrell | 340/5.64 |
| 2005/0122918 | A1 | 6/2005 | Johnston | |
| 2006/0238324 | A1 * | 10/2006 | Kachouh et al. | 340/442 |
| 2006/0279411 | A1 * | 12/2006 | Reimus et al. | 340/10.33 |
| 2007/0164875 | A1 * | 7/2007 | Fredericks et al. | 340/815.45 |
| 2009/0135950 | A1 * | 5/2009 | Hoffmann et al. | 375/298 |

FOREIGN PATENT DOCUMENTS

WO 2006/138344 12/2006
WO WO 2006138344 A1 * 12/2006

OTHER PUBLICATIONS

International Search Report and Written Opinion mailed Jul. 16, 2008.

* cited by examiner

*Primary Examiner* — Thomas G Black
*Assistant Examiner* — Lin B Olsen

(57) ABSTRACT

A receiver receives transmission containing information from different vehicle systems and determines an origin of that transmission according to the length of the transmission.

14 Claims, 1 Drawing Sheet

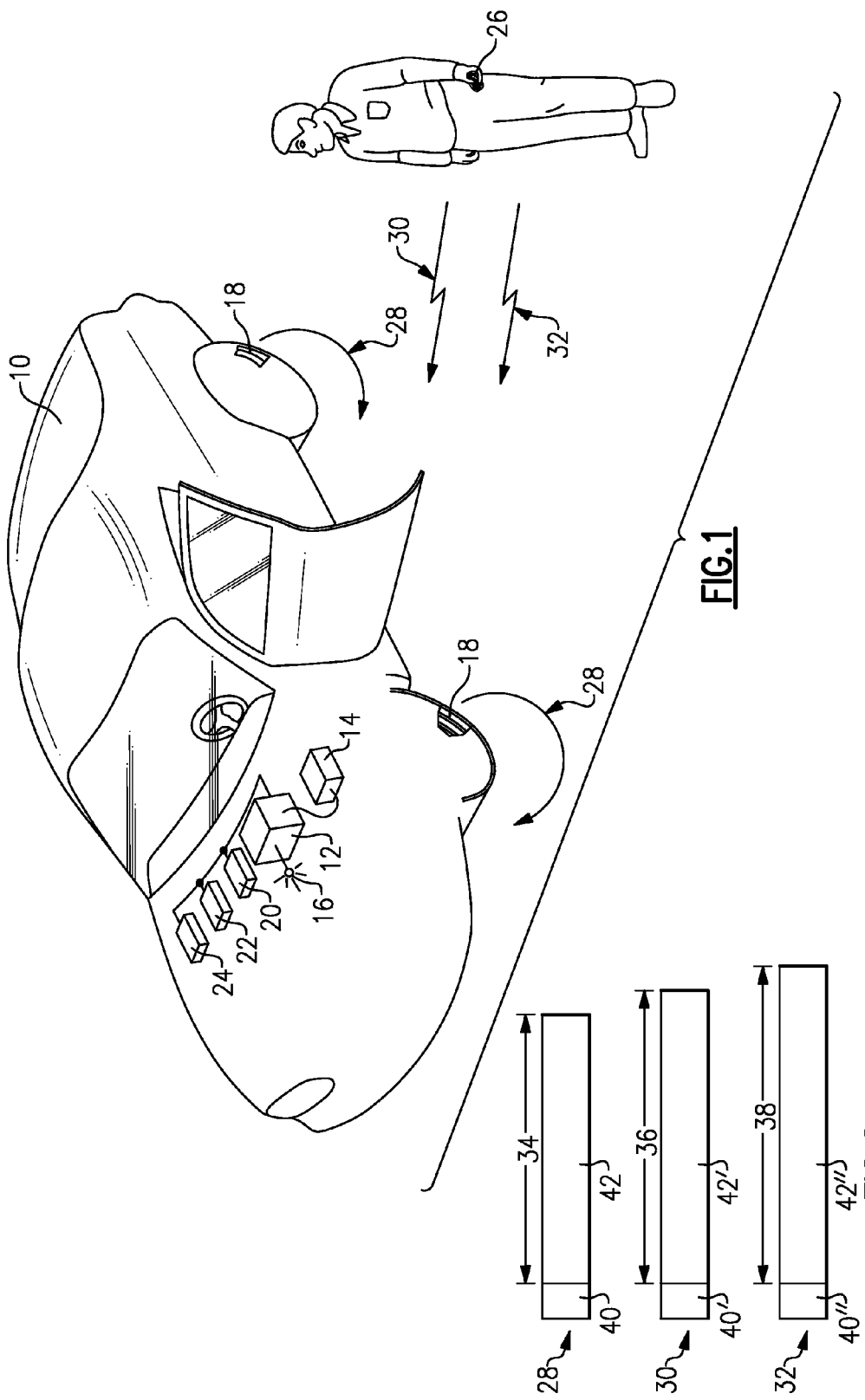

MULTIPLE PROTOCOL RECEPTION AND DIFFERENTIATION

CROSS REFERENCE TO RELATED APPLICATION

The application claims priority to U.S. Provisional Application No. 60/881,767 which was filed on Jan. 22, 2007.

BACKGROUND OF THE INVENTION

This invention generally relates to a device and method for receiving radio frequency signals. More particularly, this invention relates to a device and method for differentiating between messages with the same data rate and modulation.

A receiver utilized for receiving both tire pressure data and remote keyless entry data requires a method of differentiating the two signals. One known method includes the use of different modulations and data rates. Accordingly, the receiver will selectively look for a signal of a specific modulation. Another know method includes the use of a header for signals of the same modulation and data rate. The header includes information that identifies the type of signal comprising the data. These methods require additional information and are not always applicable to a vehicle system.

Accordingly, it is desirable to develop different methods of determining the origin of a message without utilizing unique header information or different message modulations.

SUMMARY OF THE INVENTION

An example receiver receives transmission containing information from different vehicle systems and determines an origin of that transmission according to the length of the transmission.

The example receiver receives transmissions from each of the vehicle systems in a common transmission protocol. A number of data bits of the transmission are utilized to determine the origin of the transmission. Each vehicle system transmits a signal having a unique number of data bits. Upon completion of any transmission, the number of data bits is determined and utilized to determine the origin of the transmission and direct the information as is required.

Accordingly, the example system provides for the identification of origin of any transmission for systems within the vehicle to allow common transmission protocols for all system within the vehicle. Further, the receiver can then be easily programmed and operated for use with several systems utilizing a common transmission protocol as the only difference can be easily determined upon completion of any transmission.

These and other features of the present invention can be best understood from the following specification and drawings, the following of which is a brief description.

BRIEF DESCRIPTION OF THE DRAWINGS

FIG. 1 is a schematic view of a vehicle including an example RF receiver.

FIG. 2 is a schematic view of example transmissions from various vehicle systems.

DETAILED DESCRIPTION OF THE PREFERRED EMBODIMENT

Referring to FIG. 1, a vehicle 10 includes a receiver 12 that is controlled by a controller 14. The receiver 12 includes an antenna 16 for receiving radio frequency signal from various vehicle operating systems. The example vehicle 10 includes a tire pressure monitoring system 20 that includes sensors 18 disposed within each of the tires. The sensors 18 emit a first transmission 28 containing information indicative of conditions within the corresponding tire. A remote keyless entry system 22 provides remote operation of the vehicle doors and other functions responsive to receipt of a second transmission 30 from a key fob 26 carried by an operator. The vehicle 10 also includes a passive start and entry system 24 that operates to provide vehicle operation responsive to a third transmission 32 from the key fob 26. Each of the example vehicle systems communicates information and instructions to the controller 14 through the one receiver 12.

The one receiver 12 provides for the reception of transmissions from each of the vehicle systems and therefore a means for determining from which system a transmission has originated is required. As appreciated, different transmission protocols such as frequency shift keyed, amplitude shift keyed, and other known transmission protocols can be utilized for the different systems. However, different transmission protocols require different receivers, or a receiver specifically configured to receive transmission of multiple protocols.

The example receiver 12 receives transmissions from each of the vehicle systems in a common transmission protocol. A number of data bits of the transmission are utilized to determine the origin of the transmission. Accordingly, the receiver 12 does not determine from what system one of transmission is from until the entire transmission is received. As appreciated, although a tire pressure monitoring system 20, a remote keyless entry system 22 and a passive entry and start system 24 are illustrated, other systems that communicate information through a wireless transmission signal would also benefit from this disclosure.

Referring to FIG. 2, with continuing reference to FIG. 1, each of the first, second and third transmissions 28, 30, and 32 include a header portion 40 and a data portion 42. Other formats of transmission could be utilized as are know. The number of data bits for each of the transmissions 28, 30, and 32 are different. Accordingly, the first transmission includes a first number of data bits 34. The second transmission 30 includes a second number of data bits 36, and the third transmission 32 includes a third number of data bits 38. The headers 40, 40', and 40" can include the same number of data bits, or may include different numbers of data bits to provide for application specific requirements.

The result is that the first transmission 28 includes the first number of data bits 34 that is different than the second number of data bits 36 from the second transmission 30. Further, the third transmission 32 includes a third number of data bits 38 that is different than both the first and second transmissions 28, 20.

In operation, the receiver 12 receives one of the first, second and third transmissions 28, 30, and 32. During receipt of the transmission, the receiver 12 and controller 14 do not act on the information contained in the transmission. Instead, the controller 14 and receiver 12 simply receive the complete transmission. Once the transmission is complete, a determination is made as to how many data bits were in the transmission. The number of data bits is then utilized to determine which system the information contained in the transmission corresponds to. The controller 14 then routes and/or acts on the information as required by the corresponding system.

In the event that a transmission is interrupted, the number of data bits comprising that transmission cannot be known. In this instance, the incomplete transmission is ignored in favor of receiving another complete transmission where the number of data bits can be determined. Additionally, the receiver 12 can be cycled on and off according to a desired interval to prevent collisions and overlap of different transmission from different systems.

Accordingly, the example system provides for the identification of origin of any transmission for systems within the vehicle to allow common transmission protocols for all system within the vehicle. Further, the receiver can then be easily programmed and operated for use with several systems utilizing a common transmission protocol as the only difference can be easily determined upon completion of any transmission.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A method of determining transmission origin comprising the steps of:
   receiving one of a first transmission including a first number of data bits from a first origin for a first system or a second separate transmission including a second number of data bits from a second origin for a second system with a receiver, wherein each of the first transmission and the second transmission are of a common protocol;
   determining an origin of the received transmission with a controller associated with the receiver based on the total number of data bits contained in the received transmission after receipt of all of the received transmission; and
   forwarding the received data bits to one of the first and second systems responsive to the determination of origin.

2. The method as recited in claim 1, wherein the first number of data bits is different than the second number of data bits.

3. The method as recited in claim 1, wherein the first transmission originates from a tire pressure monitoring system and the second transmission originates from a remote keyless entry system.

4. The method as recited in claim 1, wherein the determination of origin occurs upon completion of receipt of one of the first transmission and the second transmission.

5. The method as recited in claim 1, wherein the receiver comprises one receiver for receiving the first transmission and the second transmission.

6. The method as recited in claim 5, wherein the receiver considers the first transmission and the second transmission the same until one of the first and second transmissions are complete.

7. The method as recited in claim 1, further including receiving a third transmission including a third length of data bits, and the step of determining that the third transmission originates from a third system is responsive to the third number of data bits.

8. A receiver assembly for communicating with a plurality of vehicle systems, the receiver assembly comprising:
   a receiver capable of receiving at least a first transmission from a first system and a second transmission from a second system, wherein each of the first transmission and the second transmission are of a common protocol; and
   a controller operating the receiver and determining an origin of a received transmission responsive to a number of data bits contained in the received transmission after receipt of the entire received transmission.

9. The assembly as recited in claim 8, wherein the first transmission includes a first number of data bits and the second transmission includes a second number of data bits different than the first number of data bits.

10. The assembly as recited in claim 8, wherein the first system comprises a tire pressure monitoring system and the second system comprises a remote keyless entry system.

11. The assembly as recited in claim 8, further including the receiver capable of receiving a third transmission having a protocol common with the first and second transmissions from a third system, wherein the third transmission includes a third number of data bits different than both the first transmission and the second transmission.

12. The assembly as recited in claim 8, wherein the controller forwards the transmission to one of the first system and the second system responsive to the determination of the origin.

13. The assembly as recited in claim 8, wherein the receiver is adapted to receive both the first transmission and the second transmission.

14. The assembly as recited in claim 13, wherein the receiver cycles between receipt of the first transmission and receipt of the second transmission.

* * * * *